March 10, 1936.  J. R. THORP  2,033,455
VENTILATING WING
Filed Feb. 4, 1935
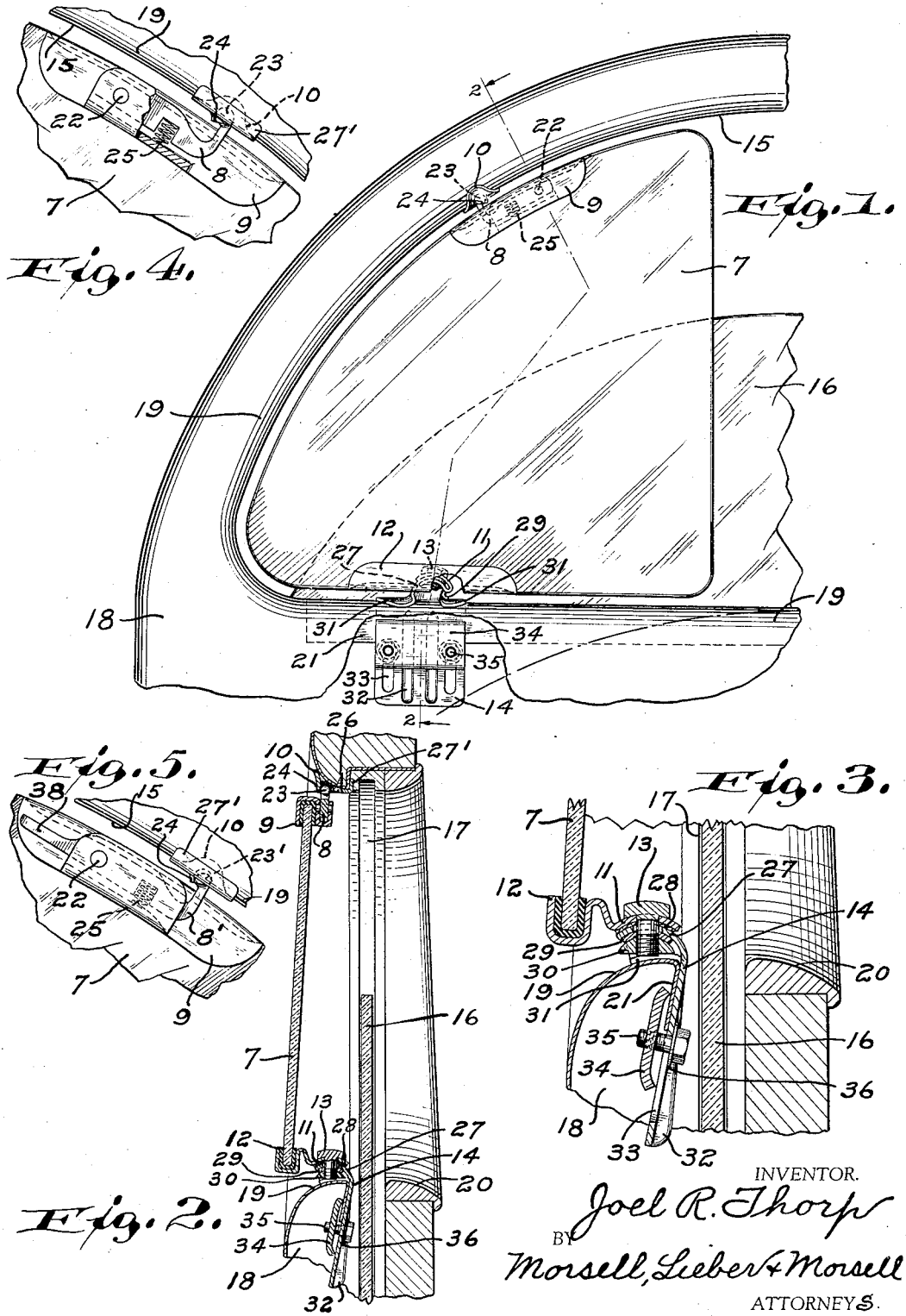
INVENTOR.
Joel R. Thorp
BY
Morsell, Lieber & Morsell
ATTORNEYS.

Patented Mar. 10, 1936

2,033,455

UNITED STATES PATENT OFFICE 2,033,455

VENTILATING WING

Joel R. Thorp, West Allis, Wis., assignor to The Fulton Company, West Allis, Wis., a corporation of Wisconsin Application February 4, 1935, Serial No. 4,889

14 Claims. (Cl. 296—84)

The present invention relates in general to improvements in the art of ventilation, and relates more specifically to improvements in the construction and operation of ventilating wings which are associable with the side windows of vehicles and are adjustable to control the supply of fresh air admitted to the vehicle enclosures.

Generally defined, an object of the present invention is to provide an improved vehicle ventilating wing structure, which is simple and durable in construction, and which is, moreover, highly effective in actual use.

Many different types of ventilating side wings have heretofore been constructed and applied to the side windows of enclosed automobiles and other vehicles, and while most of these prior ventilators have proven relatively satisfactory in actual use, they are either relatively flimsy and unattractive in construction, or else too complicated and costly. With the present pronounced tendency toward the streamlining of pleasure cars, and the odd shaping of the front, side door window openings, the upper and lower reveals, and especially the former, are no longer horizontally disposed as in the past, and the upper reveal, in fact, merges in and becomes an integral part of the front reveal at the forward portion of each side door opening. These wings are preferably adjustable for draft regulation about a substantially upright axis, but due to the relative angular disposition of the portions of the reveals which are available for attachment and pivotal mounting of the wings in the modern automobiles, it has heretofore been impossible, with the prior wing structures, to secure a simple, durable, and sufficiently firm pivotal wing mounting adapted for application to the various types of modern cars without undesirably mutilating and marring the vehicle structure.

It is therefore a more specific object of the present invention to provide an improved ventilating wing mounting whereby such wings may be quickly and firmly attached to or subsequently removed from odd or unusual-shaped window structures, without undesirably marring the supporting structure, and which maintain maximum flexibility of operation in actual use.

Another specific object of the present invention is to provide an improved vehicular side wing structure which can be manufactured and sold at minimum cost, and which is sturdy in construction and highly attractive in appearance.

A further specific object of the present invention is to provide an improved air deflector which can be applied as an accessory to various types of modern automobile windows, and which may be readily adjusted about supporting pivots having non-alined axes.

Still another specific object of the present invention is to provide an improved support for an air deflecting wing, which will permit swinging of the deflector shield away from the main window with which the wing is associated, for the purpose of permitting unobstructed cleaning of the outer surface of the main window glass.

An additional specific object of the present invention is to provide a new and useful side wing mounting bracket which can be rigidly and permanently secured in place without obstructing the normal opening and closing movement of the main window glass, and wherein excessive stressing of the wing shield is avoided.

Another specific object of the present invention is to provide a ventilating wing mounting wherein the wing is swingable about a common center either about a substantially upright axis during normal adjustment, or about a lower center and away from the main window glass to permit access to the latter for cleaning purposes.

A further specific object of the present invention is to provide glass deflector supporting elements which may be conveniently manufactured of sheet metal with the aid of punches and dies, and which when assembled, provide a neat and substantial support for the deflector.

These and other specific objects and advantages will be apparent from the following detailed description; and some of the novel features of automobile ventilating wing construction shown and casually described, but not claimed specifically herein, form the subject of my copending applications Serial No. 690,822, filed September 25, 1933, and Serial No. 737,897, filed August 1, 1934.

A clear conception of the several improved features constituting the present invention, and of the mode of constructing, installing, and of utilizing ventilating wings built in accordance with the improvement, may be had by referring to the drawing accompanying and forming a part of this specification, wherein like reference characters designate the same or similar parts in the several views.

Fig. 1 is an outside elevation of the upper forward portion of the front side door of an automobile, showing one of the improved ventilating wings attached thereto at the main window opening, the main window glass being shown partially lowered in full lines, and completely lowered in dot-and-dash lines;

Fig. 2 is a transverse section through the side door and deflector shield structure of Fig. 1, the section being taken along the irregular line 2—2;

Fig. 3 is an enlarged transverse substantially vertical section through the lower reveal and lower wing supporting elements;

Fig. 4 is a similarly enlarged inside elevation of the upper reveal and upper wing supporting elements, a portion of the latter being broken away; and Fig. 5 is a similar elevation of a modified form of upper wing supporting elements and of the adjacent reveal.

While the invention has been shown and specifically described herein as being applied to a swingably adjustable ventilating wing of a particular type especially adapted for detachable cooperation with the front side door of a particular style of automobile, it is not the intent to unnecessarily limit the scope by such specific embodiment, since some of the new features may be capable of other and more general application with the same advantageous results.

Referring specifically to Figs. 1 to 4, inclusive, of the drawing, the improved ventilating wing shown therein comprises, in general, a transparent air deflecting shield 7 preferably formed of relatively strong plate or shatter-proof glass; an upper pivot element 8 resiliently supported upon a channel member 9 secured to the upper edge of the shield 7 and coacting with a socketed bracket element 10 to provide an upper pivotal mounting for the shield; and a lower resilient pivot element 11 formed integral with a channel member 12 secured to the lower edge of the shield 7 and coacting with a pivot 13 and with a supporting bracket element 14 to provide a lower pivotal mounting for the shield.

The shield 7 is shaped to substantially follow the contour of the main window opening 15 with respect to which the main window 16 is vertically slidable in guideways 17 carried by the door or frame 18, and the deflector shield is swingably adjustable with respect to the main window 16 about non-alined pivotal axes. The upper and lower edges of the wing shield 7 may be slightly notched for reception of the channel members 9, 12, respectively, and these members are permanently attached to the shield edges within the notches in any suitable manner, so as to eliminate projection of the members 9, 12 outwardly beyond the peripheral edge of the shield 7. If so desired, the two channel members 9, 12 may be part of a single strip or channel extending along and over the entire front edge of the shield 7, but the use of such a single channel strip is not necessary with the present improvement since the supporting pivots are so constructed that the glass shield 7 is subjected to minimum stress by its mountings, when properly assembled and installed.

The main window opening 15 is bounded by gracefully curved outer and inner reveals 19, 20, and the frame 18 is formed of sheet metal and has an inner apron flange 21 formed integral therewith at the lower portion of the opening 15 and extending downwardly some distance away from the outer reveal 19 adjacent to the main window glass. While this apron flange 21 is normally inaccessible when the main window 16 is elevated, the peculiar structure of the main window, made necessary by the streamlining of the vehicle, causes the main window glass to move downwardly beyond the lower edge of the flange 21 when the window is fully opened, thereby making the apron relatively freely accessible, as clearly indicated by the dot-and-dash line of Fig. 1.

The upper pivotal mounting, comprising the pivot element 8, channel member 9, and bracket element 10, may be formed entirely of sheet metal with the aid of punches and dies, or some of these parts may, if desired, be composed of die castings. The pivot element 8 is swingably supported upon the channel member 9 by a pivot pin 22 and has a spherical bearing 23 which is urged into and is normally maintained in contact with a rubber seating within the socket 24 of the bracket element 10, by a helical compression spring 25, as clearly shown in Fig. 4. The socketed bracket element 10 is formed to fit and is attached to the outer main window reveal 19 by means of one or more screws 26, and has an integral flange 27' which engages the inner surface of the reveal 19. The spring 25, while serving primarily to maintain the ball bearing 23 against the seating within the socket 24, also compensates for slight differences in shape and size of the window openings 15; and it will be noted that the ball and socket upper pivot provides for universal pivoting of the deflector shield 7 at its upper mounting.

The lower pivotal mounting, comprising the integral pivot element 11 and channel 12, and the bracket element 14, is likewise preferably formed of sheet metal with the aid of punches and dies, and the element 11 which is of spherical shape coacts with the spherical upper portion 27 of the element 14 through an intervening spherical-shaped friction washer 28. A spherical flange 29 formed integral with the pivot element 11, coacts with the lower surface of the bracket portion 27, and the pivot 13 penetrates these spherical element portions and is retained in position by a substantially semi-spherical nut 30 coacting with the flange 29 and with screw threads on the pivot 13. In order to permit limited universal motion of the pivot element 11, flange 29 and pivot 13 relative to the portion 27 of the bracket element 14, the opening in the latter through which the pivot 13 extends is made somewhat larger in diameter than the pivot, as clearly shown in Fig. 3.

The bracket element 14, on opposite sides of its bearing portion 27, is provided with outwardly projecting flanges 31 formed to fit the outer reveal 19, and the supporting and attaching portion of the bracket element 14 projects downwardly in the space between the apron flange 21 and the path of sliding of the main window 16. This depending attaching portion of the element 14 is preferably provided with reenforcing ribs 32 near its medial part, and with vertical elongated slots 33 on opposite sides of the central ribs 32; and a clamping plate 34 is adapted to be positioned in contact with the outer faces of the flange 21 and of the element 14, and to be firmly held in this position by means of clamping screws 35 which penetrate the slots 33 and coact with lock washers 36. Both the bracket element 14 and the clamping plate 34 are preferably made of considerable length, and the heads of the clamping screws 35 are accessible for manipulation only when the main window 16 has been completely lowered as shown in dot-and-dash lines in Fig. 1.

When the several parts of the improved ventilating wing have been properly constructed and initially assembled, the device may be readily applied as an accessory to a standard automobile frame 18 after the main window 16 has been lowered to its extreme position, as indicated in dot-and-dash lines in Fig. 1. With the main window 16 thus lowered, the forward portion of the apron flange 21 is readily accessible through the gap between the outer and inner reveals 19, 20. By loosening the clamping screws 35, the lower bracket element 14 may be positioned with the upper spaced flanges 31 thereof in contact with the top of the outer reveal 19, and with the depending ribbed portion thereof in engagement with the inner surface of the apron flange 21. With the aid of a wrench applied to the head of one of the clamping screws 35, and by virtue of the provision of the slots 33, the plate 34 may subsequently be elevated to bring the upper portion thereof in engagement with the outer surface of the apron flange 21. The clamping screws 35 may then be adjusted to cause the lower edge of the plate 35 to engage the surface of the bracket element 14 beneath the lower edge of the flange 21, and to subsequently draw the plate 34 and the bracket element 14 into firm clamping engagement with the intervening apron flange 21. With the lower bracket element 14 thus firmly attached to the frame 18, the upper bracket 10 may be subsequently permanently fastened into position by bringing the flange 27' thereof into intimate contact with the edge of the window frame adjacent the guide 17, and by subsequently applying the fastening screws 26. After the structure has been thus assembled, the shield 7 may be swung about the pivot 13 and the pivot ball 23, to various angular positions relative to the main window 16, and such angular adjustment may be carried throughout a relatively wide range without interfering with the normal raising and lowering of the main window. The friction washer 28 coacting with the spherical pivot element 11 and with the spherical bracket portion 27, aided by the spring 25 which urges the spherical bearing 23 into the socket 24, serve to maintain the shield 7 in the desired positions of adjustment, and when the shield 7 is disposed substantially parallel to the main window 16, it lies just beyond the outer side surface of the frame 18. The formation of the spring 25 and the coaction thereof with the upper pivot element 8, will obviously serve to maintain the upper bearing 23 in contact with the socket 24 in spite of variations in the shape of the outer reveal 19; and if removal of the device becomes desirable, such removal may obviously be quickly effected without undesirably marring the external finish of the window frame to which it had been applied.

It may in some instances be desirable to provide for outward swinging movement of the deflector shield 7 about its lower edge, so as to permit more convenient access to the outer surface of the main window 16 for cleaning purposes. Such swinging movement of the shield 7, in addition to its normal pivotal adjustment, may be accomplished by making the upper pivot element releasable from the upper supporting bracket, as shown in Fig. 5. In this modified structure, the upper pivot element 8' again coacts with the socket 24 of an upper bracket element 10, and the spherical bearing 23' of the element 8' is urged into the socket 24 by a spring 25. The pivot element 8' is swingably supported upon a pivot pin 22 and is additionally provided with a manipulating extension 38, whereby the element 8' may be swung about its pivot pin 22 sufficiently to release the ball bearing 23' from the socket 24. With the pivotal connection thus broken, the shield 7 may be swung outwardly away from the main window glass 16, and the degree of this swinging movement, which is compensated for by the same pivotal connection about which the shield 7 is normally adjustable, may be varied by merely providing slightly greater play between the pivot 13 and the spherical bearing portion 27 of the lower bracket element 14.

From the foregoing description it will be apparent that the present invention provides an improved ventilating wing which can be manufactured and sold at relatively low cost, and which can, moreover, be firmly attached to window frames of odd and varied shapes. The improved lower mounting can be rigidly attached to the window frame without clamping against the outer surface of the reveal, and without danger of having the attachment become loose due to vibration. The upper mounting may be readily applied to the window frame and serves to compensate for variations in the vertical distance between the upper and lower mountings, and when provided with a manipulating extension 38, such as shown in Fig. 5, permits rapid and convenient swinging of the deflector shield 7 substantially about its lower edge, in order to facilitate access to the outer surface of the main window 16. The improved mountings are simple and compact in construction and present a neat and highly finished appearance and, furthermore, prevent undesirable stressing of the glass shield 7. The apron flange 21, which is formed integral with the metal constituting the outer reveal 19, may be of various heights without precluding attachment of the improved lower bracket thereto, and may be bent outwardly as illustrated herein in order to afford greater clearance between the clamping screws 35 and the glass 17. When the device has been properly applied to a window, there is no interference whatsoever with the normal opening and closing movement of the main window 16, and the disposition of the pivots 13, 23, remote from the plane of the shield 7, enhances the available extent of adjustment of the deflector shield. The improved structure has been found to be readily attachable to various types of modern enclosed automobile designs, and has proven highly successful in actual commercial use.

It should be understood that it is not desired to limit the present invention to the exact details of construction and to the precise mode of applying and of utilizing the device herein shown and described, for various modifications within the scope of the claims may occur to persons skilled in the art.

It is claimed and desired to secure by Letters Patent:

1. In combination with a main window having a flange disposed between the glass and the outer reveal thereof, a deflector shield, upper and lower brackets pivotally associated with the upper and lower portions of said shield, means for attaching said upper bracket to an upper portion of the main window frame, said lower bracket having portions cooperable with the upper surface of said outer reveal and with the inner side of said flange, and means cooperable with the outer side of said flange for clamping said lower bracket in place.

2. In combination with a main window having a normally concealed apron flange disposed between the glass and the outer reveal thereof, a deflector shield adjustable to assume various angular positions with respect to the main window glass, an upper bracket secured to an upper portion of the main window frame and pivotally associated with an upper portion of said shield, a lower bracket having portions pivotally associated with a lower portion of said shield and coacting with the inner side of said apron flange, and a clamping plate coacting with the outer side of said flange and with said bracket beyond the lower edge of said flange, said plate being concealed by said outer reveal.

3. In combination with a main window having a normally concealed apron flange disposed between the glass and the outer reveal thereof, a deflector shield adjustable to assume various angular positions with respect to the main window glass, an upper bracket secured to an upper portion of the main window frame and pivotally associated with an upper portion of said shield, a lower bracket having an upper bearing portion pivotally associated with a lower portion of said shield and having a depending portion coacting with the inner side of said apron flange, and a clamping plate coacting with the outer side of said flange and adjustably secured to said bracket.

4. In combination with a main window having a depending lower apron flange, a deflector shield, an upper pivotal mounting for said shield, and a lower pivotal mounting for said shield, said lower mounting comprising a bracket pivotally associated with said shield and coacting with one side of said apron flange, a clamping plate coacting with the opposite side of said flange and with said bracket, and adjustable means connecting said clamping plate and said bracket below said flange.

5. In combination with a main window having a reveal and a depending apron flange formed integral with the reveal and disposed adjacent to the main window glass, a deflector shield, an upper pivotal mounting for said shield, and a lower pivotal mounting comprising a bracket having an upper spherical portion extending over said reveal and pivotally associated with said shield and having a depending portion coacting with the side of said flange adjacent the window glass, a clamping plate coacting with the opposite side of said flange, and means for forcing said plate and said depending bracket portion against said apron flange.

6. In combination with a main window having an apron flange depending from the outer reveal near the window glass, a deflector shield, an upper bracket secured to the window frame near an upper portion of said shield and having a socket, a pivot element resiliently supported by the upper portion of said shield and having a bearing cooperating with said bracket socket, a pivot element secured to a lower portion of said shield and extending inwardly toward the main window, and a lower bracket secured to said apron flange and having a central bearing portion coacting with said pivot element, said lower bracket having bearing flanges on opposite sides of said central bearing portion coacting with the window frame.

7. In combination, a deflector shield having pivot elements secured to opposite edge portions thereof and extending laterally away from the plane of the shield, one of said pivot elements having a spherical ball bearing resiliently urged away from said shield, a bracket having a socket coacting with said ball bearing, the other of said pivot elements having an integral spherical bearing portion, a bracket having an integral bearing portion coacting with said pivot element portion, and a depending flange having clamping means mounted thereon for permanently fastening said second-mentioned bracket in place.

8. In combination with a main window having a depending apron flange, a deflector shield, an upper pivotal mounting for said shield, and a lower pivotal mounting comprising a bracket having an upper bearing portion pivotally associated with said shield and having a slotted depending portion coacting with the inner side of said apron flange, and clamping means adjustably coacting with the slots of said depending bracket portion for permanently attaching the same to said apron flange.

9. In combination with a main window having an apron flange near the bottom of the window opening, a deflector shield, an upper pivotal mounting for said shield, and a lower pivotal mounting for said shield comprising a bracket having universal coaction with said shield and also having a slotted depending portion coacting with one side of said apron flange, clamping means coacting with the opposite side of said apron flange, and means movable in the slots of said depending bracket portion for urging said clamping means against said apron flange.

10. In combination with a main window having a fixed apron flange disposed adjacent the glass thereof, a deflector shield pivotally adjustable with respect to the main window glass, a pivotal mounting for the upper portion of said deflector shield, a pivotal connection at the lower end of said shield including a bracket having a depending portion coacting with the inner surface of said apron flange, a clamping plate coacting with the opposite side of said apron flange, and clamping screws connecting said depending bracket portion and said clamping plate, said clamping screws and said clamping plate being movable along said depending bracket flange toward and away from said apron flange.

11. In combination with a main window having an apron flange near the lower portion of the window opening, a deflector shield disposed outwardly of and some distance away from the main window glass, a pivotal mounting between the upper end of said shield and the main window frame, and a pivotal mounting between the lower edge of said deflector shield and the window frame, said lower mounting comprising a pivot element secured directly to said deflector shield and having a spherical bearing portion, a bracket having a spherical bearing portion coacting with said pivot element portion and also having a depending slotted flange coacting with the inner face of said apron flange, a clamping member coacting with the opposite face of said apron flange and with said bracket flange, and clamping bolts connecting said plate with said bracket flange, said bolts being movable along the slots of said bracket flange to move said plate toward and away from said apron flange.

12. In combination with a main window having a vertically slidable glass and an apron flange disposed above the upper edge of said glass when in lowermost position, a deflector shield disposed laterally adjacent to the main window glass, a pivotal mounting for the upper medial portion of said shield, a pivotal mounting for the lower medial portion of said shield including a bracket having a depending flange interposed between said apron flange and the main window glass, clamping means coacting with the side of said apron flange remote from the main window, and means for urging said clamping means in contact with said apron flange and with said bracket flange.

13. In combination with a main window having an apron flange near the bottom of the window opening, a deflector shield disposed laterally adjacent to the main window glass, a detachable pivotal mounting for the upper medial portion of said shield, a single lower pivotal mounting for said shield formed to permit both angular adjustment thereof about a substantially upright axis and swinging of said shield substantially about its lower horizontal edge away from the main window, said lower pivotal mounting including a bracket having a depending flange interposed between said apron flange and the main window glass, and clamping means for detachably connecting said bracket flange to said apron flange.

14. In combination with a main window having an apron flange near the bottom of the window opening, a deflector shield disposed laterally adjacent to the main window glass, a detachable pivotal mounting for the upper medial portion of said shield, a single lower pivotal mounting for said shield formed to permit both angular adjustment thereof about a substantially upright axis and swinging of said shield substantially about its lower horizontal edge away from the main window, said lower pivotal mounting including a bracket having a depending flange interposed between said apron flange and the main window glass, clamping means coacting with the side of said apron flange remote from the main window, and means for urging said clamping means in contact with said apron flange and with said bracket flange.

JOEL R. THORP.